A. A. WORZEN.
RADIATOR STAND.
APPLICATION FILED DEC. 23, 1919.
1,354,428.
Patented Sept. 28, 1920.
2 SHEETS—SHEET 1.
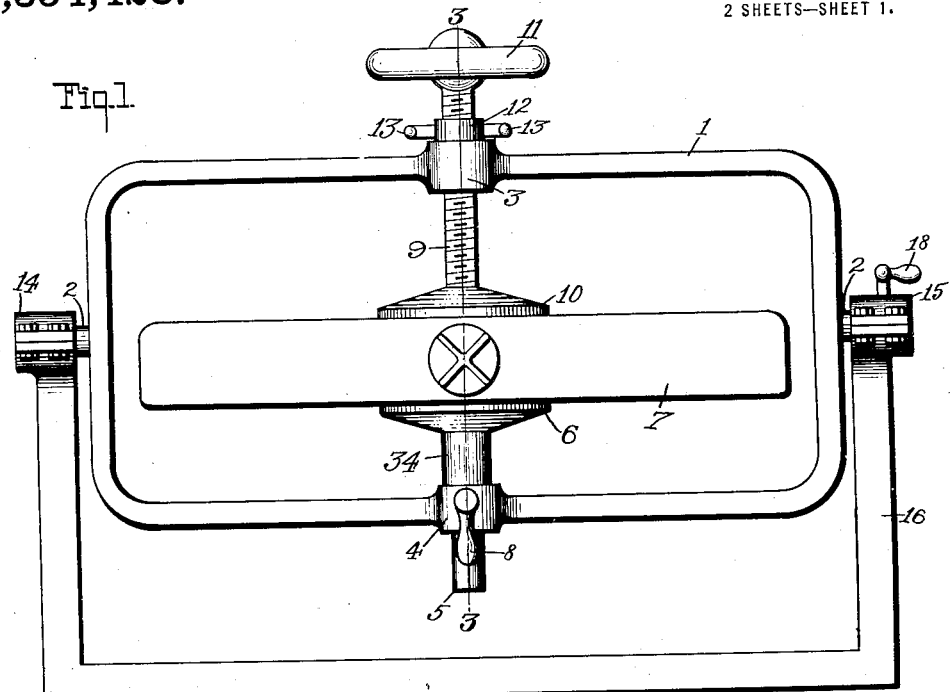
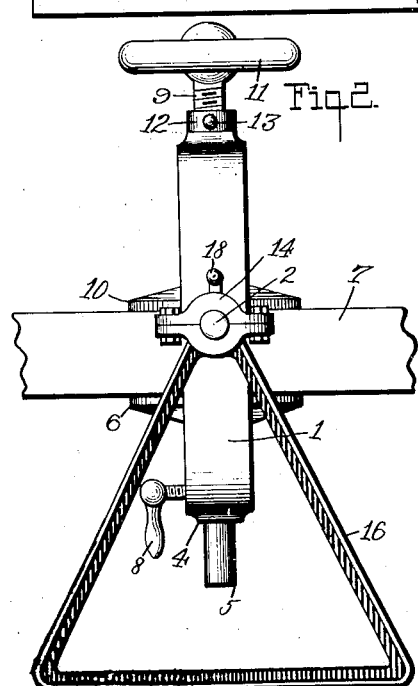
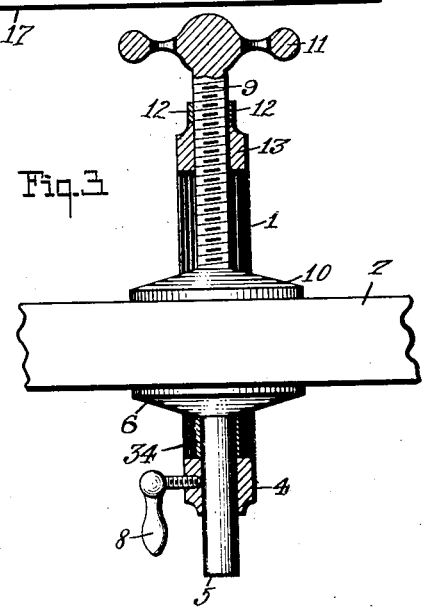
INVENTOR
A. A. Worzen,
BY
ATTORNEYS

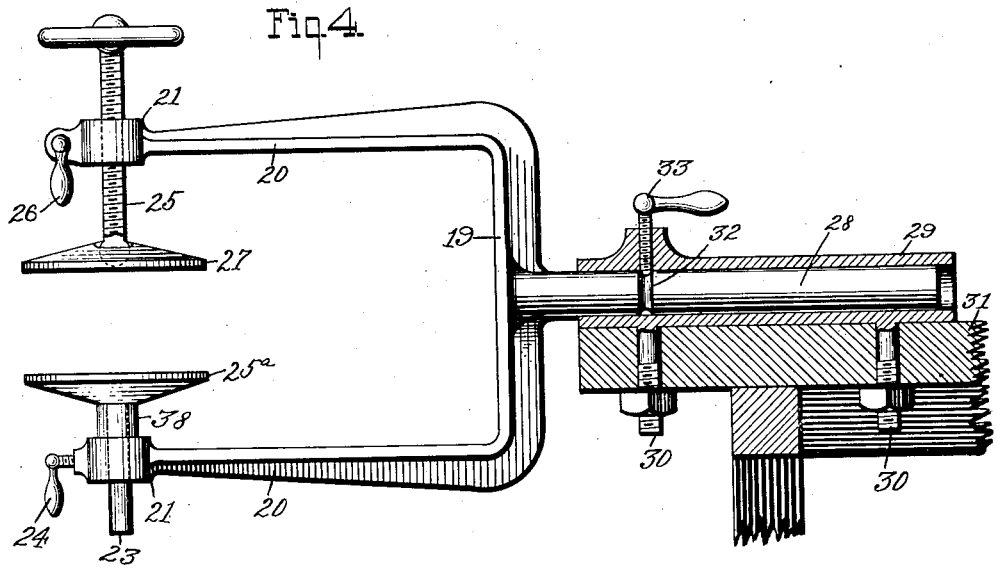
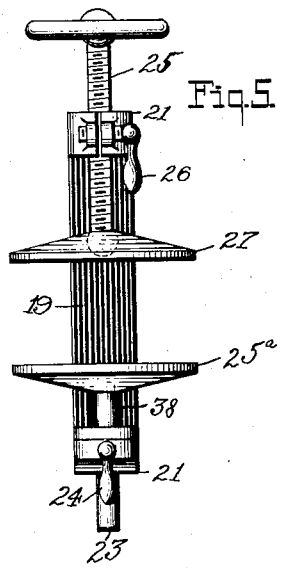
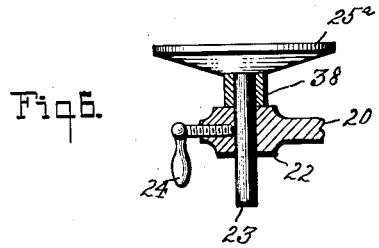
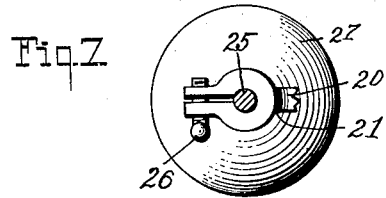

UNITED STATES PATENT OFFICE.

ANTON ALBERT WORZEN, OF BROWNSVILLE, PENNSYLVANIA.

RADIATOR-STAND.

1,354,428.  Specification of Letters Patent.  Patented Sept. 28, 1920.

Application filed December 23, 1919. Serial No. 347,043.

*To all whom it may concern:*

Be it known that I, ANTON ALBERT WORZEN, a citizen of the United States, and a resident of Brownsville, in the county of Fayette and State of Pennsylvania, have invented certain new and useful Improvements in Radiator-Stands, of which the following is a specification.

My invention is an improvement in radiator stands, and has for its object to provide a stand of the character specified adapted to be connected with a stand, work bench or the like, for grasping and holding a radiator in such position that every part of the radiator is accessible, and which is capable of adjustment to bring every part of the radiator into position to be worked upon.

In the drawings:

Figure 1 is a front view of the improved stand;

Fig. 2 is an end view;

Fig. 3 is a section on the line 3—3 of Fig. 1, the supporting stand being omitted;

Fig. 4 is a side view showing another embodiment of the invention, with parts in section;

Fig. 5 is an end view;

Fig. 6 is a vertical section through the lower engaging arm;

Fig. 7 is a top plan view of the upper bearing, with the screw in section.

In the embodiment of the invention shown in Figs. 1 to 3, the stand comprises a substantially rectangular or loop shaped frame 1, having at the center of each of its ends an outwardly extending journal pin 2 and having at the center of each of its sides bearings 3 and 4, respectively.

A shank 5 is adjustably mounted in the bearing 4, the said shank carrying a head 6 which is adapted to engage one face of the radiator 7, and the shank is held in adjusted position in the bearing by means of a handled set screw 8. A screw 9 is threaded through the bearing 3, and this screw has a head 10 similar to the head 6 for engaging the upper face of the radiator. The screw has a wheel 11 at its upper end, and a lock nut 12 is engaged with the screw above the bearing 3, the said lock nut having oppositely extending pins 13 for convenience in manipulating the same.

The frame 1 may be supported in any suitable or desired manner by means of the journal pins 2. In the present instance the journal pins are journaled in sectional bearings 14 and 15 in the ends of a supporting base to be described. This base has ends 16 which are substantially triangular open frames, the bearings 14 and 15 being at the apices of the said frames, and the base angles of the frame are connected by longitudinally extending members 17. A handled set screw 18 is threaded through the upper section of the bearing 15, into engagement with the adjacent journal pin, to hold the frame 1 in adjusted position.

In use, with the radiator in place, it will be evident that practically every part of the radiator is accessible when the parts are arranged as shown in Fig. 1—in fact, every part except that which is directly between the heads 6 and 10. To bring any portion of the radiator into more convenient position the frame 1 may be rotated as a whole on the journal pins 2, to place the radiator with its plane in vertical position or in any angle between the horizontal and the vertical. By means of the screw 9 and the shank 5 the radiator may be moved toward the top or the bottom of the frame 1 and by loosening the head 10 the radiator may be moved about on the head 6.

In Figs. 4 to 7, inclusive, there is shown another arrangement more specially adapted for use with an ordinary work bench and not requiring any particular form of support or stand. With this construction a yoke, consisting of a body 19 and arms 20 extending laterally from the body, is provided, each arm having a bearing 21 and 22, respectively, at the end remote from the yoke body. Through the bearing 22 a shank 23 is slidable, being held in adjusted position by a handled screw 24, and the shank carries a head 25$^a$ at its upper end corresponding to the head 6 of Fig. 1.

A screw 25 corresponding to the screw 9 of Fig. 1 is threaded through the bearing 21, and this is a split bearing, as shown, the bearing being capable of being clamped on the screw or released therefrom by means of a handled screw 26 which engages radial lugs at the sides of the split. The screw 25 has a head 27 for coöperating with the head 25$^a$, and it will be seen, referring to Figs. 4 and 5, that the said head 27 is connected to the screw by a ball and socket bearing. This construction may also be used in Fig. 1 if desired.

A mandrel 28 extends from the center of the body 19 of the yoke, and this mandrel is adapted to engage a sleeve 29 which is provided with depending threaded pins 30 adapted to pass through openings in a table top 31. The mandrel has an annular groove 32 intermediate its ends and this groove is engaged by a handled screw 33 which is threaded through the sleeve into engagement with the mandrel. By loosening the screw the plane of the yoke may be inclined into any position between the horizontal and the vertical, and in either construction the radiator may be reversed merely by reversing the supporting frame, namely, the frame 1 of Fig. 1, and the frame or yoke 19—20 of Fig. 4.

The head 6 is limited in its downward movement toward the bearing 4 in the construction of Fig. 1 by a sleeve 34 which encircles the shank between the bearing and the head, and the head 25ᵃ is limited in its downward movement toward the arm 20 by a similar sleeve 38.

I claim:

1. A device of the character specified comprising a frame having means for engaging the upper and lower faces of a radiator, said means being adjustable laterally with respect to the plane of the frame, and means for supporting said frame to rotate on a transverse axis parallel with the plane of the radiator when held by the engaging means, said engaging means comprising heads, each of the said heads being adjustable with respect to the frame, and one of the heads having threaded engagement with the frame.

2. A device of the character specified comprising a frame having means for engaging the upper and lower faces of a radiator, said means being adjustable laterally with respect to the plane of the frame, and means for supporting said frame to rotate on a transverse axis parallel with the plane of the radiator when held by the engaging means, said adjusting means comprising heads for engaging opposite faces of the radiator, a shank supporting one of the heads and a screw supporting the other, the frame having bearings through which the shank and screw are passed, the screw having threaded engagement with the bearings, and means for rigidly securing the screw and the shank with respect to the bearings.

3. A device of the character specified comprising a substantially rectangular frame having means connected with opposite sides thereof for engaging a radiator between them, and having journal pins at its ends rotatably supporting the frame.

4. A device of the character specified comprising a substantially rectangular frame having means connected with opposite sides thereof for engaging a radiator between them and having journal pins at its ends, and a stand on which the journal pins are journaled.

ANTON ALBERT WORZEN.